Nov. 15, 1949    E. W. BOURNE, JR    2,488,465
SHAFT SEAL
Filed Feb. 18, 1946

EDMUND W. BOURNE, JR.
INVENTOR.

BY
ATTORNEY

Patented Nov. 15, 1949

2,488,465

UNITED STATES PATENT OFFICE 2,488,465

SHAFT SEAL

Edmund W. Bourne, Jr., Ramona, Calif.

Application February 18, 1946, Serial No. 648,226

1 Claim. (Cl. 288—3)

The invention herein disclosed relates to fluid seals for rotating shafts.

Objects of the invention are to provide a seal for a rotating shaft or the like which will effectively seal in both directions, that is, both inboard and outboard of the shaft, without, or substantially without frictional drag on the shaft and without appreciable wear, so that it will maintain proper sealing contact with the shaft and thus maintain its efficiency practically indefinitely.

Other objects of the invention are to provide an oil seal of simple construction, small size and low cost and in which the active parts will be protected against foreign matter which otherwise might affect the continuing efficiency of the device.

Other desirable objects and the novel features through which the purposes of the invention are attained are set forth or will appear in the course of the following specification.

The drawing accompanying and forming part of the specification illustrates several of the present practical embodiments of the invention but structure may be further modified and changed, all within the true intent and scope of the invention as hereinafter defined and claimed.

Fig. 1 in the drawing is a broken perspective and part sectional view illustrating one of the seals in position on a shaft;

Basically the seal consists of a hollow or tubular annulus of resilient sealing material having a plurality of narrow, spaced annular sealing webs or ribs projecting from the inner wall of the same and having the outer peripheral wall split to admit and then be closed over a garter spring bearing on the solid inner wall directly over the spaced ribs.

Figure 1:
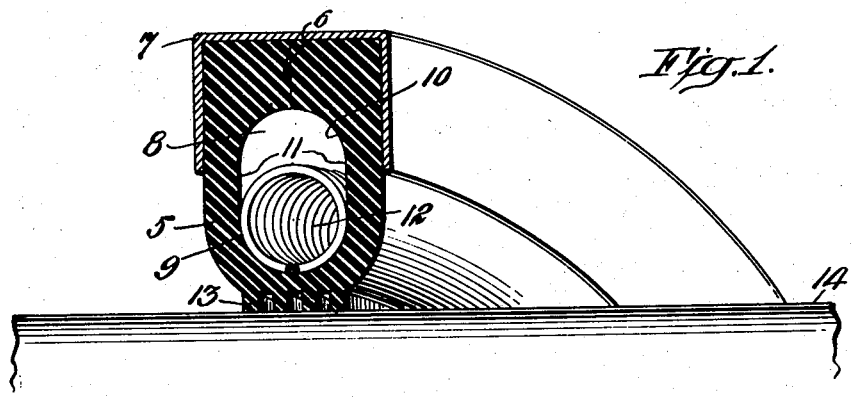
Figure 2:
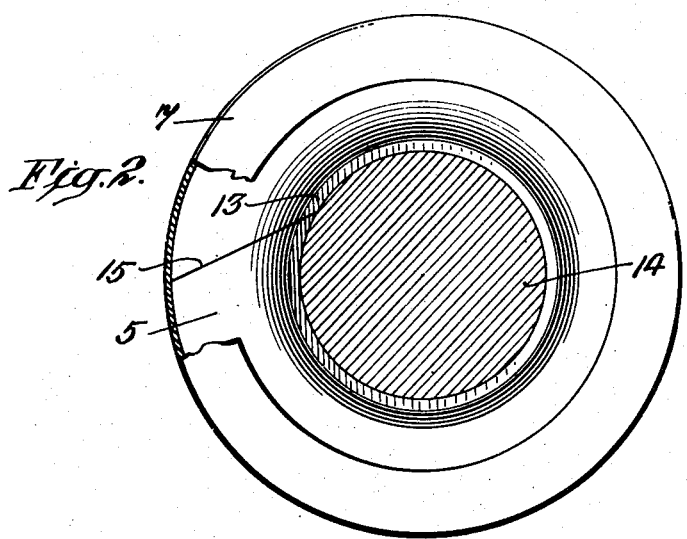
Fig. 2 is a broken cross sectional view of the same.

In the form shown in Figs. 1 and 2, the annulus 5 is extended radially and the outer peripheral wall, split at 6, is confined within an annular metal case 7 of U-shaped cross section.

The annular chamber 8, in this first illustrated form of the invention, has substantially semicircular inner and outer walls 9, 10, connected by straight side walls 11, providing expansion space for the garter spring 12 seated on the semicircular inner wall.

In this first form of the invention the sealing ribs, webs or lips are in the nature of flanges 13 projecting radially inwardly from the inner wall and of a substantial width with abruptly angled inner edges making surface engagement, as distinguished from line engagement with the shaft 14.

Projecting straight inwardly and having abruptly angled laterally extended inner edges, these flanges form sealing lips which are equally effective in both directions and located as they are in closely spaced relation, one alongside of the other, they supplement each other to stop fluid flow and prevent passage of foreign matter in either direction.

In Fig. 1 four closely spaced sealing flanges are shown. This provides a desirable arrangement for general purposes, distributing the slight load imposed by the spring over four zones of contact with the shaft.

The closing of the split chamber about the spring excludes foreign matter which might clog or interfere with the free action of the spring or the sealing ring. The radial extension of the spring chamber 8 provides ample expansion space for the spring and is of aid in locating the spring in the chamber in the first instance.

The sealing ring is of a cross section which may be readily extruded or otherwise made up in continuous lengths and then cut on an incline and brought together and sealed in the form of a continuous ring, as indicated at 15 in Fig. 2.

The material for the body of the seal may be chosen according to the particular service the device may be put to. Synthetic rubber such as "Hycar" and the like have been found suited to most purposes.

Figure 3:
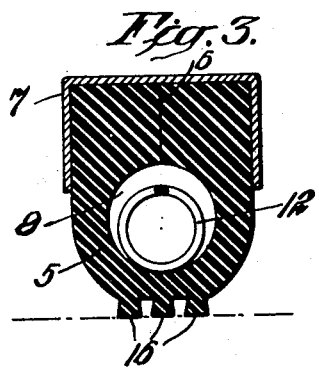
Figs. 3 and 4 are cross sectional views of other forms of the seal.
Figure 4:
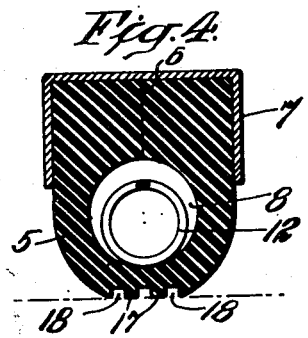

Figs. 3 and 4 show how the spring chamber 8 may be circular in cross section and expansion space be provided by having this circular cross section of somewhat larger diameter than the cross section of the enclosed garter spring. These views also illustrate the fact that the wide or extended surface sealing flanges may be different in shape and number.

Thus in the Fig. 3 construction the spaced sealing flanges 16 are three in number and are outwardly tapered in cross section, giving them a frusto pyramidal cross section, with the widened bases resting on the shaft.

In Fig. 4 two straight slided sealing flanges 17 are provided at the center of the ring simply by formation of three annular grooves 18 directly in the inner wall of the ring.

The seal disclosed is of particularly simple and inexpensive construction. It is easily assembled and installed and is effective in both directions, against pressure as well as in the absence of pressure. The extended surface engagement of the plural sealing lips avoids wear even under heavy duty conditions.

The grooves 18 between the webs or flanges, being relatively narrow and deep, will hold a lubricating paste or grease such as an indium base grease or a silicone base grease, thus to supply lubricant to the inside or inner web or webs. Such lubricant may be filled in the grooves before the seal is placed over the shaft, to insure that the inner web or webs will continue properly lubricated while sealed from lubricant by the outer sealing webs or flanges.

What is claimed is:

A fluid seal for a rotating shaft or the like comprising a tubular annulus of resilient material, substantially circular in cross section and having a split outer wall, a solid inner wall and a plurality of radially extending sealing flanges extending inwardly from the inner side of said inner wall, said sealing flanges having abrupt inner edges for surface as distinguished from line engagement with the shaft and having a greater axial width at their ends than where they join said inner wall and a garter spring enclosed in said tubular annulus and bearing on said solid inner wall over said inwardly extending sealing flanges, said sealing flanges being separated from each other by relatively narrow and deep outwardly extending annular grooves adapted for holding in place a lubricating paste or grease which will lubricate the innermost flange or flanges which may be excluded from external lubricant by the outermost edge flanges of the seal and said garter spring being substantially circular in cross section and substantially filling the substantially circular cross section of said tubular annulus to maintain the latter distended, and said separated sealing flanges bearing approximately uniformly on the shaft.

EDMUND W. BOURNE, Jr.

REFERENCES CITED

The following references are of record in the file of this patent:

UNITED STATES PATENTS

| Number | Name | Date |
| --- | --- | --- |
| 1,713,364 | Arbon | May 14, 1929 |
| 2,233,359 | Rogers | Feb. 25, 1941 |
| 2,257,119 | Johannesen | Sept. 30, 1941 |
| 2,274,234 | Ekkebus et al. | Feb. 24, 1942 |

FOREIGN PATENTS

| Number | Country | Date |
| --- | --- | --- |
| 876,866 | France | Of 1942 |
| 467,935 | Great Britain | Of 1937 |